(12) United States Patent
Tenny (10) Patent No.: US 10,524,224 B2
(45) Date of Patent: Dec. 31, 2019

(54) METHOD AND SYSTEM FOR POSITIONING OF REMOTE USER EQUIPMENT

(71) Applicant: FutureWei Technologies, Inc., Plano, TX (US)

(72) Inventor: Nathan Edward Tenny, Poway, CA (US)

(73) Assignee: Futurewei Technologies, Inc., Plano, TX (US)

( * ) Notice: Subject to any disclaimer, the term of this patent is extended or adjusted under 35 U.S.C. 154(b) by 62 days.

(21) Appl. No.: 15/653,119

(22) Filed: Jul. 18, 2017

(65) Prior Publication Data
US 2019/0028994 A1    Jan. 24, 2019

(51) Int. Cl.
*H04W 64/00* (2009.01)

(52) U.S. Cl.
CPC ................................. *H04W 64/003* (2013.01)

(58) Field of Classification Search
CPC ... H04L 63/08; H04L 67/104; H04L 2209/80; H04L 63/0407; H04L 63/061; H04L 63/123; H04L 63/164; H04L 2209/24; H04L 2209/76; H04L 2463/101; H04L 63/1408; H04L 9/083; H04L 9/3263; H04L 61/1511; H04L 9/30; H04L 9/3247; H04L 9/3297; H04M 2250/12; H04M 1/72572; H04M 2250/64; H04M 1/04; H04M 1/6091; H04M 1/72527; H04M 1/6066; H04M 1/725; H04M 1/72519; H04M 2242/30; H04M 2250/04; H04M 3/567; G01C 17/00; G01C 21/08; H04W 84/045; H04W 48/16; H04W 36/00; H04W 36/0066; H04W 36/0088; H04W 36/04; H04W 36/0016;
(Continued)

(56) References Cited

U.S. PATENT DOCUMENTS

| | | | |
|---|---|---|---|
| 2010/0323720 A1* | 12/2010 | Jen | H04B 7/2606 455/456.1 |
| 2011/0098057 A1* | 4/2011 | Edge | G01S 5/0018 455/456.1 |

(Continued)

FOREIGN PATENT DOCUMENTS

| | | |
|---|---|---|
| CN | 101883427 A | 11/2010 |
| CN | 101931996 A | 12/2010 |
| WO | 2013101508 A1 | 7/2013 |

OTHER PUBLICATIONS

Sony, "Discussion on evaluation methodology for feD2D", 3GPP TSG RAN WG1 Meeting #88, R1-1703142, Athens, Greece, Feb. 13-17, 2017, total 6 pages.

*Primary Examiner* — Nimesh Patel
(74) *Attorney, Agent, or Firm* — Slater Matsil, LLP (57) ABSTRACT

A method and a system for positioning of remote user equipment (UE) are disclosed. In an embodiment, a method for locating a remote UE linked to a relay UE is disclosed, the method includes receiving, by an Evolved-Serving Mobile Location Center (E-SMLC), a Location Service Application Protocol (LCS-AP) location request from a Mobility Management Entity (MME) for the remote UE, performing, by the E-SMLC, a location measurement procedure with the relay UE, calculating, by the E-SMLC, an estimated position of the remote UE based on a location measurement of the relay UE and sending, by the E-SMLC, a LCS-AP location response to the MME.

28 Claims, 5 Drawing Sheets

(58) Field of Classification Search
CPC ........... H04W 52/0209; H04W 64/003; H04W 88/06; H04W 8/08; H04W 8/24; H04W 36/0083; H04W 48/04; H04W 4/02; H04W 92/02; H04W 12/06; H04W 88/08; H04W 60/00; H04W 88/12; H04W 4/12; H04W 72/02

See application file for complete search history.

(56) References Cited

U.S. PATENT DOCUMENTS

| | | | |
|---|---|---|---|
| 2011/0176499 A1 | 7/2011 | Siomina et al. | |
| 2011/0211467 A1* | 9/2011 | Bhat | H04B 7/15542 370/252 |
| 2013/0163440 A1* | 6/2013 | Issakov | G01S 5/0221 370/246 |
| 2015/0156708 A1* | 6/2015 | Tietz | H04W 4/02 455/434 |
| 2016/0309300 A1* | 10/2016 | Dong | H04W 8/16 |
| 2016/0360370 A1* | 12/2016 | Edge | H04W 4/025 |
| 2017/0099617 A1* | 4/2017 | Tomici | H04W 28/08 |
| 2017/0195985 A1* | 7/2017 | Zhao | H04W 64/003 |
| 2017/0215168 A1* | 7/2017 | Dong | H04W 64/006 |

* cited by examiner

METHOD AND SYSTEM FOR POSITIONING OF REMOTE USER EQUIPMENT

TECHNICAL FIELD

The present disclosure relates generally to a system and method for positioning of remote User Equipment (UEs), and, in particular embodiments, to a system and method for estimating the position of the remote UEs.

BACKGROUND

For a remote User Equipment (UE) linked to a relay UE (UE-to-network relay), current positioning procedures are energy inefficient. Moreover, there is a need for positioning techniques that allow the remote UE to remain in service with the relay UE and avoid switching over from the relay UE to a direct base station remote UE operation over the Uu interface.

SUMMARY

In accordance with an embodiment of the present disclosure, a method for locating a remote user equipment (UE) linked to a relay UE includes receiving, by an Evolved-Serving Mobile Location Center (E-SMLC), a Location Service Application Protocol (LCS-AP) location request from a Mobility Management Entity (MME) for the remote UE, performing, by the E-SMLC, a location measurement procedure with the relay UE, calculating, by the E-SMLC, an estimated position of the remote UE based on a location measurement of the relay UE and sending, by the E-SMLC, a LCS-AP location response to the MME.

In accordance with another embodiment of the present disclosure, a method for locating a remote user equipment (UE) linked to a relay UE includes sending, by a Mobility Management Entity (MME), a Location Service Application Protocol (LCS-AP) location request to an Evolved-Serving Mobile Location Center (E-SMLC) for the remote UE and receiving, by the MME, a LCS-AP location response from the E-SMLC, wherein the E-SMLC performs a location measurement procedure with the relay UE, and wherein the E-SMLC calculates an estimated position of the remote UE based on a location measurement of the relay UE.

In accordance with yet another embodiment of the present disclosure, a network entity includes a memory storage comprising instructions and one or more processors in communication with the memory, wherein the one or more processors execute the instructions. The instructions include to receive a Location Service Application Protocol (LCS-AP) location request from a Mobility Management Entity (MME) for a remote user equipment (UE), perform a location measurement procedure with a relay UE, calculate an estimated position of the remote UE based on a location measurement of the relay UE and send a LCS-AP location response to the MME, wherein the relay UE and the remote UE are linked.

In accordance with a further embodiment of the present disclosure, a network entity includes a memory storage comprising instructions and one or more processors in communication with the memory, wherein the one or more processors execute the instructions. The instructions include to send a Location Service Application Protocol (LCS-AP) location request to an Evolved-Serving Mobile Location Center (E-SMLC) for a remote user equipment (UE) and receive a LCS-AP location response from the E-SMLC, wherein the E-SMLC performs a location measurement procedure with a relay UE, wherein the E-SMLC calculates an estimated position of the remote UE based on a location measurement of the relay UE, and wherein the relay UE and the remote UE are linked.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Wireless and other technologies provide methods for providing geographical location information of a User Equipment (UE). Some of these methods are listed here:

OTDOA (Observed Time Difference of Arrival) is a positioning procedure. It is a multilateration method in which the UE measures the time difference between some specific signals from several nearby base stations (e.g., eNBs) and reports these time differences to the network, in particular, to the E-SMLC, a network entity. This is an UE assisted procedure. UE-based OTDOA, in which the final computation of position is performed at the UE itself, is also technically possible although it is not supported in current releases of E-UTRA.

Enhanced Cell ID, E-CellID or E-CID is a positioning procedure introduced in Rel-9 E-UTRA. The UE may report to the network, e.g., E-SMLC, a variety of measurements associated with the serving cell, e.g., the serving cell ID, the UE's timing advance (time difference between transmit and receive time at the UE when the UE's transmit timing is adjusted to compensate for the range to the base station) and the IDs of the detected neighboring cells. The eNB may report additional information to network, e.g., E-SMLC, such as the angle of arrival and measurements previously received from the UE by the eNB. The E-SMLC estimates the UE position based on this information and its knowledge of the cell positions. This is an UE and/or eNB assisted procedure.

Uplink time difference of arrival (U-TDOA) is a positioning procedure introduced in Rel-ii E-UTRA. It is a multilateration method in which the Location Measurement Units (LMUs) located, e.g., at the eNBs, measure the time difference between some specific signals from the UE and report these time differences to the network, e.g., E-SMLC. This is an eNB or LMU assisted procedure.

Radio access technology (RAT)-independent positioning is a family of positioning procedures introduced in Rel-13 E-UTRA. It comprises multiple methods that may include, e.g., barometric pressure sensor positioning, wireless local area network (WLAN) positioning, Bluetooth positioning, and terrestrial beacon system (TBS) positioning. Some forms of RAT-independent positioning are naturally suited to being used in combination with other positioning methods. For example, barometric sensor positioning may be used to determine an altitude of the UE, which can then be combined with latitude and longitude obtained by other positioning methods to obtain a 3D position of the UE.

Global Navigation Satellite System (GNSS) provides a positioning procedure that can be used to locate UEs based on measurements of signals from satellites in a GNSS constellation, e.g., GPS, Galileo, GLONASS, etc. GNSS is less dependent on the telecommunications network topology. This is a UE assisted or UE based procedure.

Figure 1:
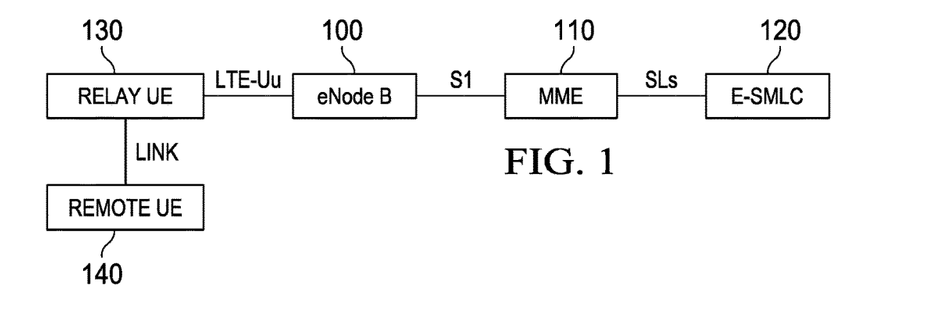
FIG. 1 shows an embodiment of an E-UTRAN UE positioning architecture.

FIG. 1 shows an E-UTRAN positioning architecture. The remote UE 140 is linked to a relay UE 130, the relay UE 130 is connected via the air interface (Uu interface) with a base station such as a eNodeB (eNB) 100, the eNodeB 100 is connected via the Si interface to the Mobility Management Entity (MME) 110, a network entity, and the MME no is connected via the SLs interface with the Evolved-Serving Mobile Location Center (E-SMLC) 120, a location network entity.

The conventional positioning procedure is performed as follows: the E-SMLC 120 exchanges positioning measurement data according to a Long Term Evolution (LTE) positioning protocol A (LPPa) with the eNB 100 and/or according to an LTE positioning protocol (LPP) with the remote UE 140. However, the conventional positioning measurements have some issues. For example, E-CID, OTDOA and UTDOA measurement procedures are often based on measurement and transmission activities between the UE and the base station 100 on the Uu interface. However, these procedures do not work for the remote UE 140, linked to the relay 130, because the remote UE 140 does not operate on the Uu interface.

Various embodiments of the present disclosure provide an estimate of the position of the remote UE by measuring the position of the relay UE. Various further embodiments provide an estimate of the position of the remote UE by measuring the position of the relay UE and additional information related to the remote UE.

Further embodiments provide that the remote UE remains linked to the relay UE when the position measurements take place. In embodiments the remote UE does not disengage from the relay UE while the measurements are taken. For these measurement methods, the remote UE does not need to drop off the relay UE to measure on the Uu interface, or to make transmissions on the Uu interface for measurements by other entities such as the eNB or LMU. In further embodiments the positioning procedure works "through the relay UE" without requiring the remote UE to switch to the Uu interface either for measurements or transmissions. Advantageously, keeping the remote UE linked to the relay UE while position measurements take place saves battery power and avoids problems in the communications protocol stack.

Figure 2:
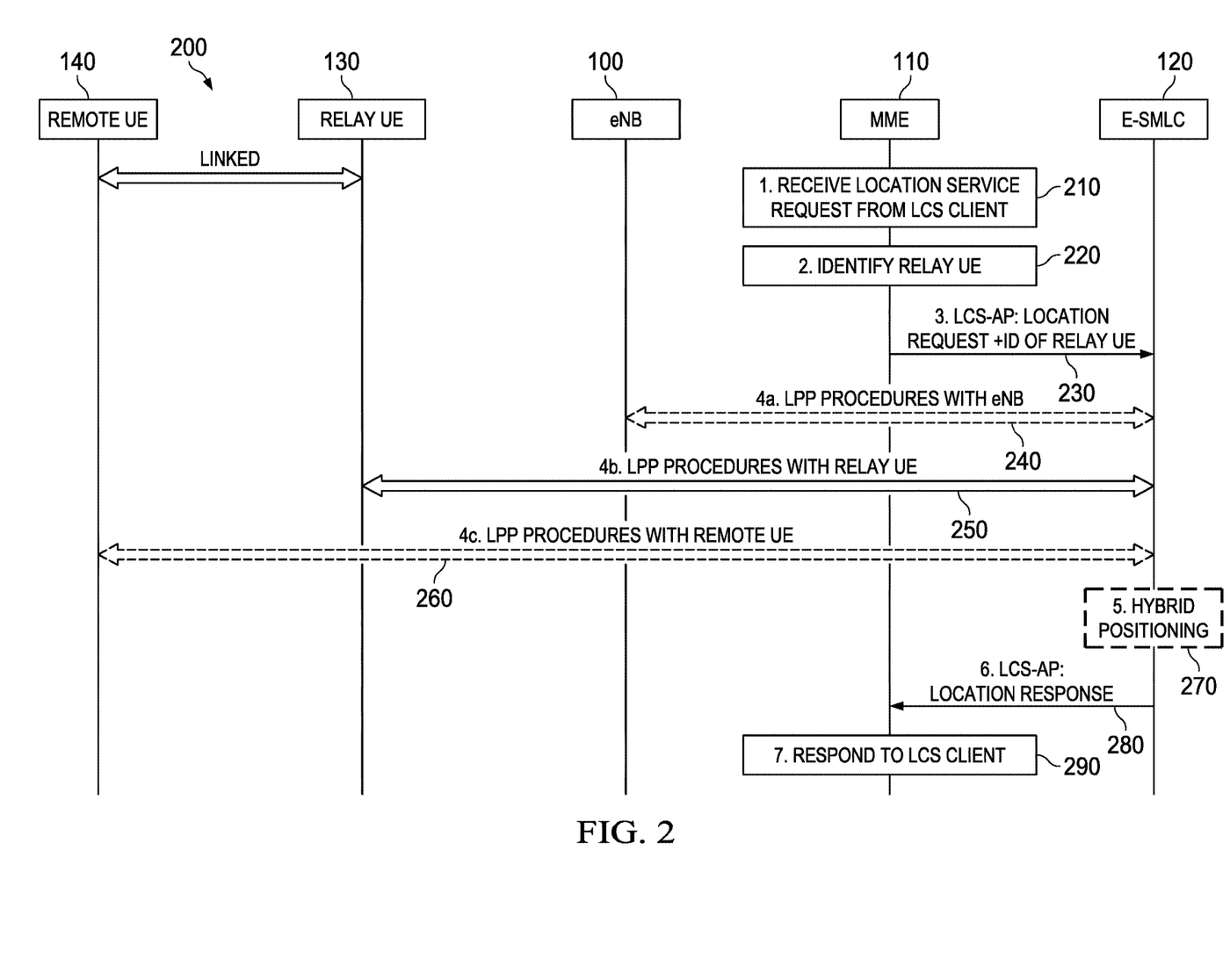
FIG. 2 shows an embodiment of a high level positioning procedure.

FIG. 2 shows an embodiment of a high level location positioning procedure 200. The method may include the following features: when the positioning service for the remote UE 140 is requested from the E-SMLC 120, the MME no indicates the identity of the relay UE 130 to which the remote UE 140 is linked. The E-SMLC 120 then performs positioning operations towards the relay UE 130 instead of or in addition to the remote UE 140. The E-SMLC 120 may use the location information of the relay UE 130 as a proxy in whole or in part for the location of the remote UE 140.

Returning to FIG. 2, at step 210, the MME no receives a Location Service Request from a LCS client for the remote UE 140. At the next step, at step 220, the MME 110 identifies the relay UE 130 to which the remote UE 140 is linked. Then, at step 230, the MME no provides the E-SMLC 120 (the MME no sends and the E-SMLC 120 receives) with a location request according to Location Service Application Protocol (LCS-AP) for the remote UE 140. The MME no adds the ID of the relay UE 130 to that location request. The MME no is able to provide the relay UE ID from its knowledge of the linked status between relay UE 130 and remote UE 140. The E-SMLC 120 may perform measurement procedures with the relay UE 130, the remote UE 140 and/or with the eNB 100. For example, measurements can be taken by the relay UE 130 only, by the relay UE 130 and the eNB 100 or by the relay UE 130 and the remote UE 140. The selection of the type of measurements to be taken may be an aspect of the implementation of the E-SMLC 120. At optional step 240, the E-SMLC 120 performs a location positioning procedure (such as a procedure of the LPPa protocol) with the eNB 100. At step 250 the E SMLC 120 performs a location positioning procedure (e.g., using the LPP protocol) with the relay UE 130. Optionally, at step 260, the E-SMLC 120 performs a location positioning procedure (e.g., using the LPP protocol) with the remote UE 140. At step 270, the E-SMLC 120 calculates the position estimate of the relay UE 130 and, in some embodiments, further refines the position estimate of the relay UE 130 based on measurements received from the remote UE 140. The calculation of the position of the relay UE 130 by one method, while further refining the resulting estimate based on measurements received from the remote UE 140, may use the so-called hybrid positioning calculation, in which measurements of different positioning methods are combined. As an example, the calculation of the position of the relay UE 130 may be based on a GNSS positioning method, and the resulting estimate may be further refined by applying a RAT-independent positioning method to the remote UE 140. After the calculation, at step 280, the E-SMLC 120 provides the MME no with the calculated position estimate in a LCS-AP location response (the E-SMLC 120 sends and the MME receives) and, at step 290, the MME no provides the response to the LCS client.

The communication between the MME no and the E-SMLC 120 may take place over the SLs interface. As already discussed, the location positioning procedure 200 may be performed with at least one of relay UE 130, remote UE 140 and eNB 100.

Figure 3A:
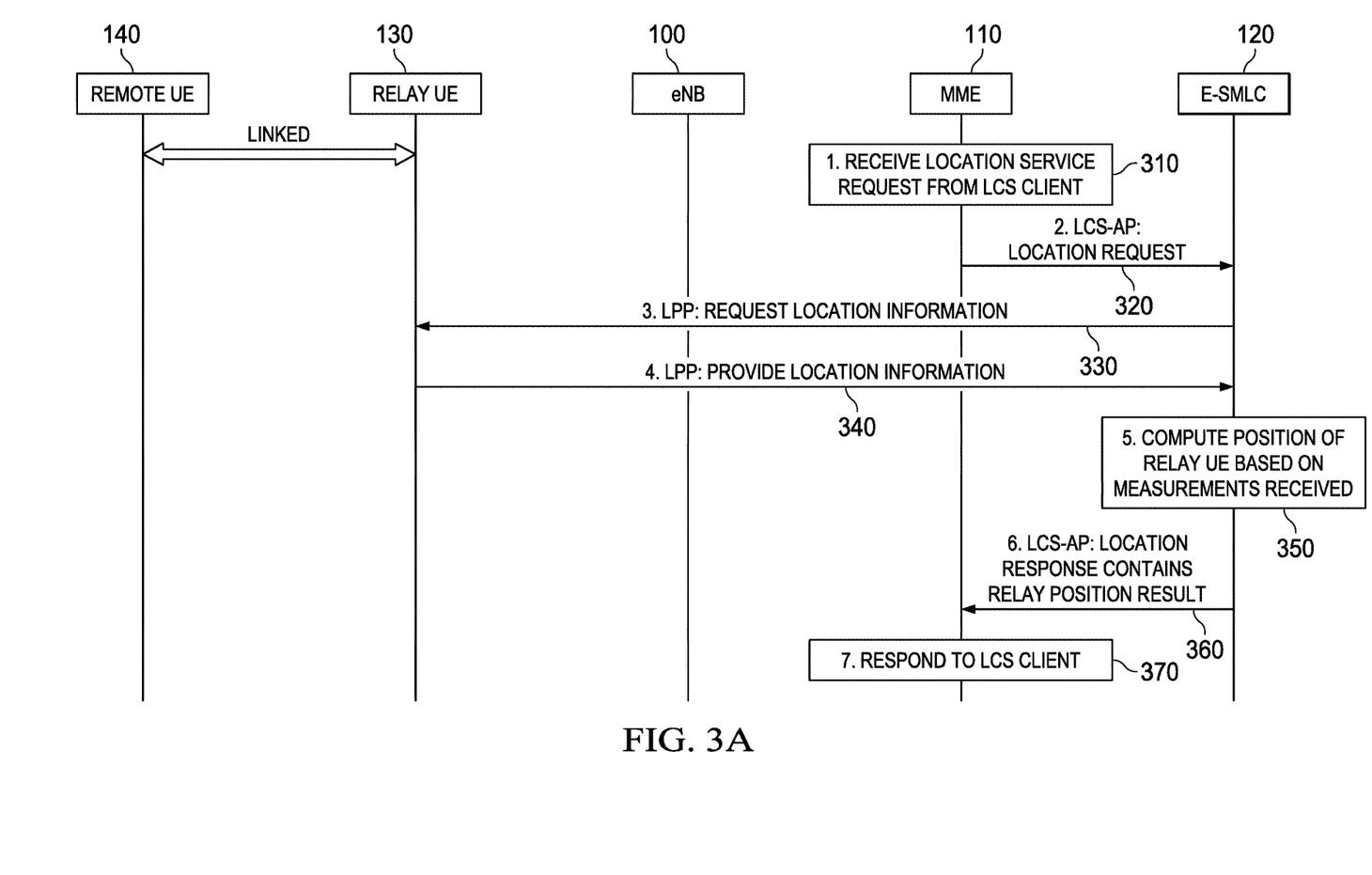
FIG. 3A shows an embodiment of a positioning procedure according to a first embodiment.

FIG. 3A shows an embodiment of a location positioning procedure for locating the remote UE 140 by determining the relay UE 130 position. The position of the relay UE 130 may be a proxy for the position of the remote UE 140.

At step 310, the MME no receives a Location Service Request from a LCS client for the remote UE 140. At the next step, at step 320, the MME 110 provides the E-SMLC 120 (the MME no sends and the E-SMLC 120 receives) with a LCS-AP location request for the remote UE 140, which may include the information that the relay UE 130 is linked to the remote UE 140. At step 330, the E-SMLC 120 performs a location positioning procedure (such as a procedure of the LPP protocol) requesting location measurement information from the relay UE 130. At step 340, the relay UE 130 sends and the E-SMLC 120 receives the location measurement information of the relay UE 130. At step 350, the E-SMLC 120 calculates and estimates the position of the relay UE 130 based on the measurement information received. At step 360, the E-SMLC 120 provides the MME no with a LCS-AP location response containing the relay UE 130 position estimate and, at step 370, the MME no provides the response to the LCS client. The location measurements for the location of the relay UE 130 can be performed by other entities than the relay UE 130, e.g., by the eNB 100, or by the relay UE 130 and the eNB 100 together. This embodiment assumes that the remote UE 140 is very close to the relay UE 130, so that using the location of the relay UE 130 as a proxy for the location of the remote UE 140 yields a result with acceptable accuracy.

Figure 3B:
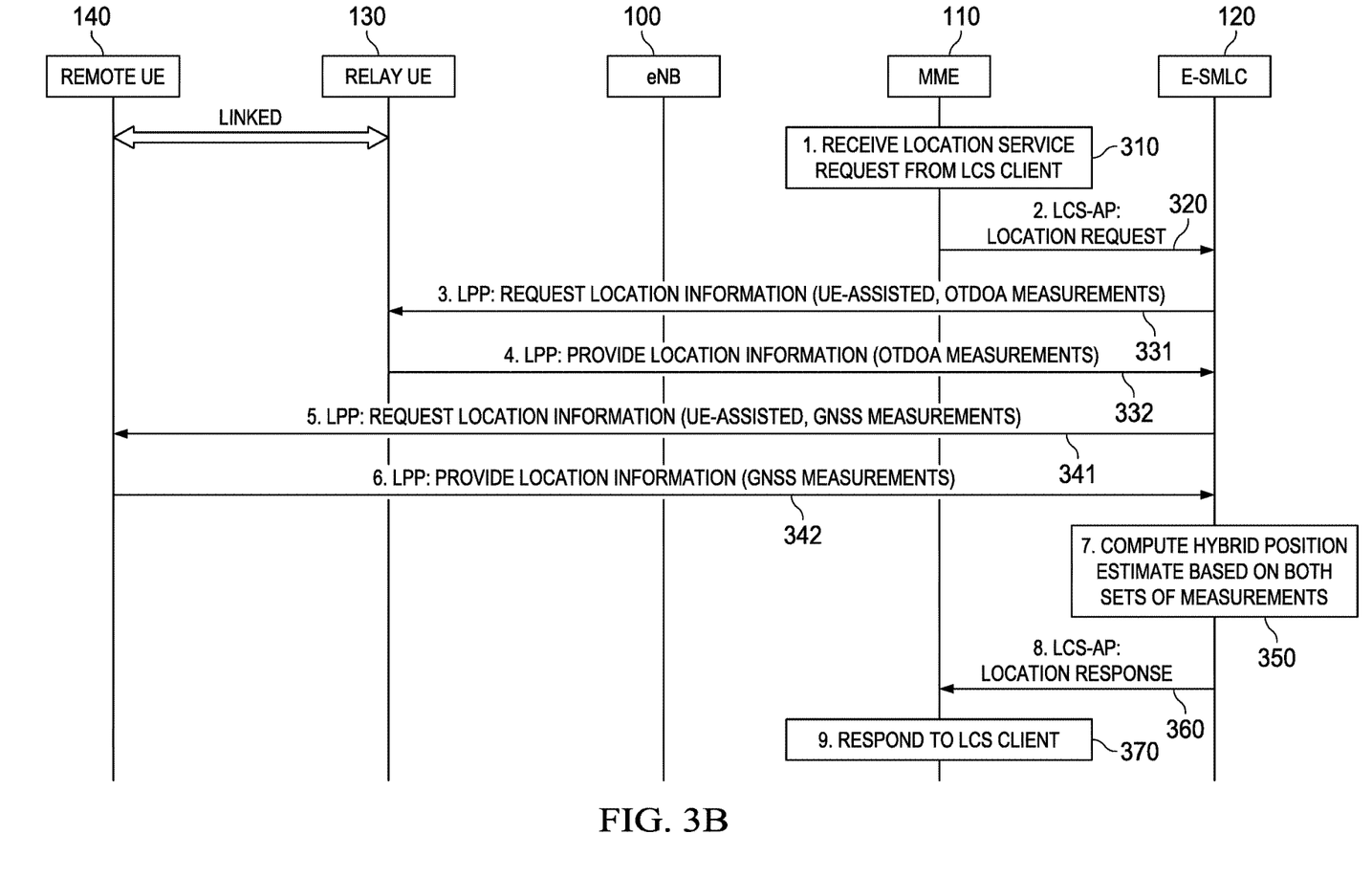
FIG. 3B shows an embodiment of a positioning procedure according to a second embodiment.

FIG. 3B shows an embodiment of a location positioning procedure for locating the remote UE 140 by location measurements of the relay UE 130 and the remote UE 140.

At step 310, the MME no receives a Location Service Request from a LCS client for the remote UE 140. At the next step, at step 320, the MME 110 provides the E-SMLC 120 (the MME no sends and the E-SMLC 120 receives) with a LCS-AP location request for the remote UE 140, which may include the information that remote UE 140 is linked with relay UE 130.

At step 331, the E-SMLC 120 performs a location positioning procedure (such as a procedure of the LPP protocol) requesting location information from the relay UE 130. The location information may be based on observed time difference of arrival (OTDOA) measurements measured by the relay UE 130. At step 332, the relay UE 130 sends and the E-SMLC 120 receives location information (e.g., OTDOA measurements) from the relay UE 130.

After receiving this information, before receiving this information or at the same time, the E-SMLC 120 performs a location positioning procedure (such as a procedure of the LPP protocol) requesting location information of the remote UE 140 at step 341. The location information may be based on Global Navigation Satellite System (GNSS) measurements measured by the remote UE 140. At step 342, the remote UE sends and the E-SMLC 120 receives the location information (e.g., GNSS measurements) of the remote UE 140.

At step 350, the E-SMLC 120 calculates the position estimate of the remote UE 140 based on both sets of measurements, i.e., the measurements received from the relay UE 130 in step 332 and the measurements received from the remote UE 140 in step 342 (hybrid positioning). At step 360, the E-SMLC 120 provides the MME no a LCS-AP location response (E-SMLC 120 sends and MME no receives) and, at step 370, the MME no provides the response to the LCS client. In this embodiment, the E-SMLC 120 is able to detect that the remote UE 140 is a UE linked to the relay UE 130.

In this embodiment, the location measurements of the remote UE 140 can be taken directly by the remote UE 140 because the GNSS positioning method does not require sending or receiving measurement or transmission signals by a cellular transmitter in the UE. This embodiment may be advantageous when position of the remote UE 140 is known but with a very high uncertainty, e.g., when the remote UE 140 is moving around in an indoor environment, or the GNSS signal is otherwise obstructed.

Figure 3C:
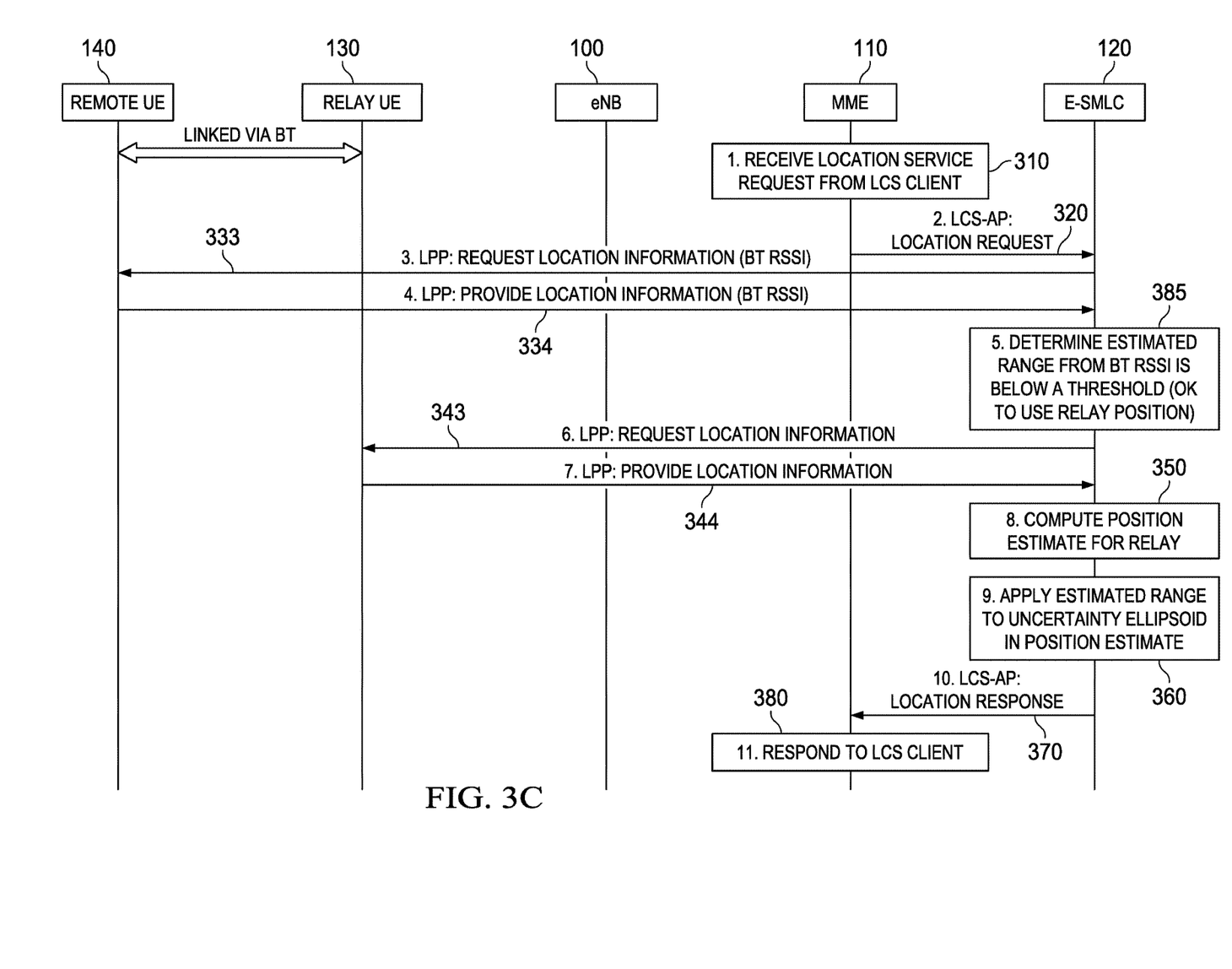
FIG. 3C shows an embodiment of a positioning procedure according to a third embodiment.

FIG. 3C shows another embodiment of a location positioning procedure for locating the remote UE 140 by location measurements of the relay UE 130 and the remote UE 140. Here, the relay UE 130 is linked to the remote UE 140 via a Bluetooth link.

At step 310, the MME no receives a Location Service Request from a LCS client for the remote UE 140. At the next step, at step 320, the MME no provides the E-SMLC 120 (the MME no sends and the E-SMLC 120 receives) with a LCS-AP location request for the remote UE 140. The E-SMLC 120 may be able to detect that the remote UE 140 is a UE Bluetooth linked to the relay UE 130. For example, the MME no may provide along with the LCS-AP location request the information that the remote UE 140 is linked via Bluetooth to the relay UE 130.

At step 333, the E-SMLC 120 requests location information (e.g., via LPP) from the remote UE 140. In particular, the E-SMLC 120 may request Bluetooth Received Signal Strength Indicator (BT RSSI) measurement data from remote UE 140. The remote UE 140 may measure these data. At step 334, the remote UE 140 sends and the E-SMLC 120 receives the location information (BT RSSI measurement data) of the remote UE 140.

At step 385, the E-SMLC 120 determines (calculates and estimates) an estimated range between the relay UE 130 and the remote UE 140 based on information gathered and received in steps 333 and 334.

In various embodiments, the gathering and reporting of the BT RSSI measurement data can also be carried out by the relay UE 130 instead of the remote UE 140.

After receiving this information, before receiving this information or at the same time, the E-SMLC 120 requests location information (e.g., via LPP) of the relay UE 130 at step 343. The relay UE 130 may measure these data. At step 344, the relay UE sends and the E-SMLC 120 receives the location information from the relay UE 130.

At step 350, the E-SMLC 120 calculates the position estimate of the relay UE 130. The position estimate of the relay UE 130 is based on the measurements communicated in steps 343 and 344. The position of the relay UE 130 may be calculated and estimated with an uncertainty (e.g., an uncertainty ellipsoid). At step 360, the E-SMLC 120 applies the estimated range calculated in step 387 to the uncertainty (ellipsoid) and the position estimate.

At step 370, the E-SMLC 120 provides the MME no a LCS-AP location response and, at step 380, the MME no provides the response to the LCS client.

In various embodiments measurements of short range technology (e.g., BT) may be used to obtain an estimate or a verification of the positioning uncertainty. In a first approximation, it can be assumed that the relay UE 130 and the remote UE 140 are truly collocated. The uncertainty of the remote UE 140 is then the same as the relay UE 130. In a second approximation the range between the remote UE 140 and the relay UE 130 can be estimated and taken into account. With respect to the first approximation, this assumption is not very accurate and regulatory concerns may require that remote UE's true position is within the computed uncertainty. However, there may be examples in which the range between the remote UE 140 and the relay UE 130 is known to be negligibly small, e.g., within the range of a personal area network (PAN), and in such cases the first approximation may be acceptable.

Several methods for short range estimation are available: 1) WLAN: The range can be estimated by measuring round trip time (RTT) using various well known techniques. The short range can be relatively accurately estimated (typical error in the single digit meters). This is a UE assisted measurement method. The measurements can be reported in LPP. 2) Bluetooth (BT): The range can be estimated measuring BT RSSI. The short range measurement only provides coarse location information. However, the results can be used to check whether the remote UE 140 is within range on the order of centimeters, meters, or tens of meters of the relay UE 130. This is a UE assisted measurement method. The measurements can be reported in LPP. 3) Device to device (D2D) (Interface PC5): The range can be estimated measuring sidelink reference signal receive power (S-RSRP), for example. The short range measurement may provide only coarse location information. However, the results can be used to check whether the remote UE 140 is within a range on the order of centimeters, meters, or tens of meters of the relay UE 130. This is a UE assisted measurement method. The measurements may be reported in LPP.

In various embodiments, the remote UE 140 measures, whenever possible, RTT first for a good range measurement. If RTT is not available, the remote UE 140 may measure the power (e.g., BT RSSI or S-RSRP). If the coarse measurement is equal or below a threshold, e.g., 10 m, use the position of the relay UE 130 as the position of the remote UE 140 and take the range into account in the uncertainty ellipsoid. If the coarse measurement is above the threshold, the server, e.g., E-SMLC 120, either returns a failure message (e.g., a message with an error code such as "positionMethodFailure") or decides to measure the remote UE 140 directly (not with an approximation or proxy position estimate via the relay UE 130).

In various other embodiments, to support the short range measurements, the E-SMLC 120 may need to know the short range RAT used between the remote UE 140 and the relay UE 130. The RAT may be provided to the E-SMLC 120 by the MME no. The short range RAT may be added to the LCS-AP Location Request (may be together with the relay UE ID). In alternative embodiments, the eNB 100 could know the short range RAT and could provide it via LPPa to the E-SMLC 120. For example, the MME 110 indicates to the E-SMLC 120 that the remote UE 140 is behind the relay UE 130 and provides to the E-SMLC 120 the ID of the relay UE 130 and the serving eNB 100. The E-SMLC 120 may then query the serving eNB 100 for the short range RAT together with other location information via LPPa.

Figure 4:
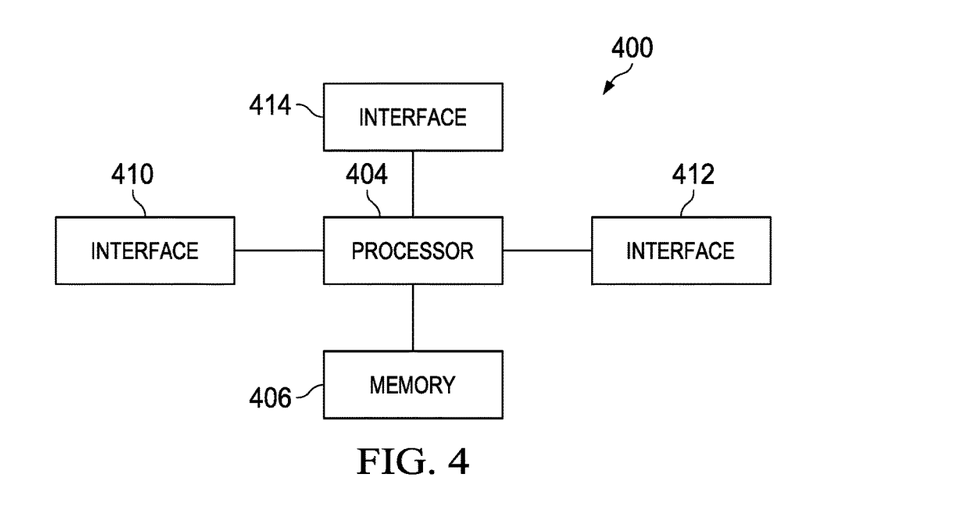
FIG. 4 illustrates a block diagram of a processing system for performing embodiment methods described herein.

FIG. 4 illustrates a block diagram of an embodiment processing system 400 for performing methods described herein, which may be installed in an eNB 100, a server such as MME no, a server such as a E-SMLC 120, a relay UE 130 and a remote UE 140. As shown, the processing system 400 includes a processor 404, a memory 406, and interfaces 410-414, which may (or may not) be arranged as shown in FIG. 4. The processor 404 may be any component or collection of components adapted to perform computations and/or other processing related tasks, and the memory 406 may be any component or collection of components adapted to store programming and/or instructions for execution by the processor 404. In an embodiment, the memory 406 includes a non-transitory computer readable medium. The interfaces 410, 412, 414 may be any component or collection of components that allow the processing system 400 to communicate with other devices/components and/or a user. For example, one or more of the interfaces 410, 412, 414 may be adapted to communicate data, control, or management messages from the processor 404 to applications installed on the UE and/or a remote device. As another example, one or more of the interfaces 410, 412, 414 may be adapted to allow a user or user device (e.g., hand held device, etc.) to interact/communicate with the processing system 400. The processing system 400 may include additional components not depicted in FIG. 4, such as long term storage (e.g., non-volatile memory, etc.). In some embodiments, at least one of the interfaces 410, 412, 414 may be a wireless to air interface, in other embodiments none of the interfaces 410, 412, 413 are wireless interfaces.

In some embodiments, the processing system 400 is included in a network device that is accessing, or part otherwise of, a telecommunications network. In one example, the processing system 400 is in a network-side device in a wireless or wireline telecommunications network, such as a base station, a relay station, a scheduler, a controller, a gateway, a router, an applications server, or any other device in the telecommunications network. In other embodiments, the processing system 400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 410, 412, 414 connects the processing system 400 to a transceiver adapted to transmit and receive signaling over the telecommunications network.

Figure 5:
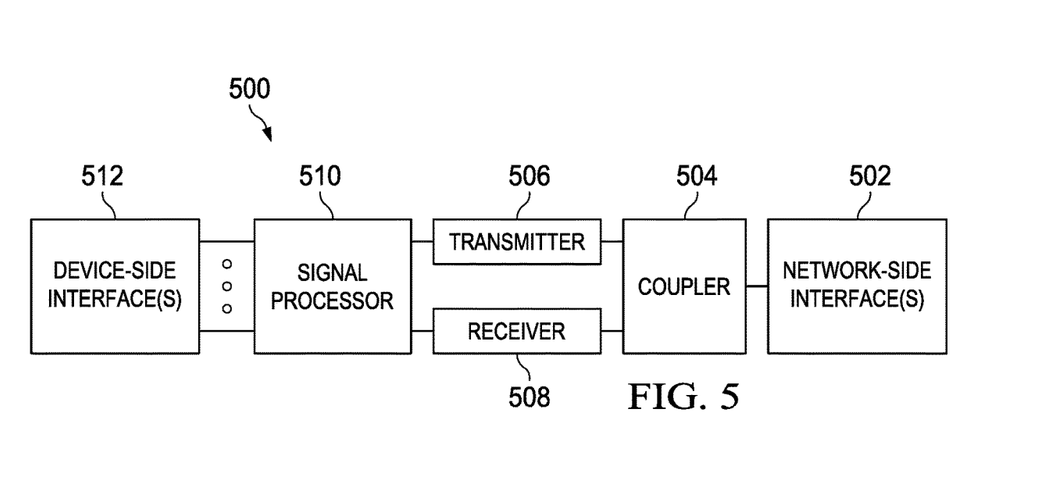
FIG. 5 illustrates a block diagram of a transceiver adapted to transmit and receive signaling over a telecommunications network.

FIG. 5 illustrates a block diagram of a transceiver 500 adapted to transmit and receive signaling over a telecommunications network. The transceiver 500 may be installed in an eNB 100 or in the relay or remote UEs 130, 140. As shown, the transceiver 500 comprises a network-side interface 502, a coupler 504, a transmitter 506, a receiver 508, a signal processor 510, and a device-side interface 512. The network-side interface 502 may include any component or collection of components adapted to transmit or receive signaling over a wireless or wireline telecommunications network. The coupler 504 may include any component or collection of components adapted to facilitate bi-directional communication over the network-side interface 502. The transmitter 506 may include any component or collection of components (e.g., up-converter, power amplifier, etc.) adapted to convert a baseband signal into a modulated carrier signal suitable for transmission over the network-side interface 502. The receiver 508 may include any component or collection of components (e.g., down-converter, low noise amplifier, etc.) adapted to convert a carrier signal received over the network-side interface 502 into a baseband signal. The signal processor 510 may include any component or collection of components adapted to convert a baseband signal into a data signal suitable for communication over the device-side interface(s) 512, or vice-versa. The device-side interface(s) 512 may include any component or collection of components adapted to communicate data-signals between the signal processor 510 and components within the host device (e.g., the processing system 400, local area network (LAN) ports, etc.).

The transceiver 500 may transmit and receive signaling over any type of communications medium. In some embodiments, the transceiver 500 transmits and receives signaling over a wireless medium. For example, the transceiver 500 may be a wireless transceiver adapted to communicate in accordance with a wireless telecommunications protocol, such as a cellular protocol (e.g., 5G or long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 502 comprises one or more antenna/radiating elements. For example, the network-side interface 502 may include multiple separate antennas or a multi-antenna array configured for multi-layer communication, e.g., multiple input multiple output (MIMO), etc. In other embodiments, the transceiver 500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In an embodiment, a method for locating a remote UE linked to a relay UE includes receiving, by a E-SMLC, a LCS-AP location request from a MME for the remote UE, performing, by the E-SMLC, a location measurement procedure with the relay UE, calculating, by the E-SMLC, an estimated position of the remote UE based on a location measurement of the relay UE and sending, by the E-SMLC, a LCS-AP location response to the MME.

In a first aspect of this embodiment performing the location measurement procedure with the relay UE comprises performing the location measurement procedure according to a procedure of an LPP protocol with the relay UE.

In a second aspect of this embodiment a procedure of an LPPa protocol with a base station is further performed.

In a third aspect of this embodiment the procedure of the LPPa protocol comprises retrieving an indication of a short range RAT used between the remote UE and the relay UE.

In a fourth aspect of this embodiment a procedure of an LPP protocol with the remote UE is further performed.

In a fifth aspect of this embodiment the location measurement procedure with the relay UE comprises receiving the location measurement according to a first positioning method and performing a location measurement procedure with the remote UE comprises receiving a location measurement according to a second positioning method.

In a sixth aspect of this embodiment the first and second positioning methods are different.

In a seventh aspect of this embodiment calculating the estimated position of the remote UE comprises calculating the estimated position of the remote UE based on the location measurements of the first positioning method and the second positioning method.

In an eight aspect of this embodiment a location measurement procedure with the remote UE is further performed, wherein a location of the remote UE relative to the relay UE is based on a location measurement by the remote UE of a short range interface between the remote UE and the relay UE, and wherein calculating the estimated position of the remote UE comprises calculating the estimated position of the remote UE based on the location measurements of the relay UE and the remote UE.

In a ninth aspect of this embodiment performing the location measurement procedure with the relay UE comprises measuring a location of the remote UE relative to the relay UE based on a measurement by the relay UE of a short range interface between the remote UE and the relay UE, and wherein calculating the estimated position of the remote UE comprises calculating the estimated position of the remote UE based at least in part on the location measurements of the relay UE.

In a tenth aspect of this embodiment a location measurement procedure with the remote UE is further performed, wherein a location of the remote UE relative to the relay UE is based on a short range measurement, an estimated range is further calculated and the LCS-AP location response is sent to the MME including the estimated position and the estimated range when the estimated range is below a threshold or the LCS-AP location response is sent to the MME including a fail indication when the estimated range is above the threshold.

In an eleventh aspect of this embodiment the LCS-AP location request includes an indication of a short range RAT used between the remote UE and the relay UE.

In another embodiment a method for locating a remote UE linked to a relay UE includes sending, by a MME, a LCS-AP location request to a E-SMLC for the remote UE and receiving, by the MME, a LCS-AP location response from the E-SMLC, wherein the E-SMLC performs a location measurement procedure with the relay UE, and wherein the E-SMLC calculates an estimated position of the remote UE based on a location measurement of the relay UE.

In a first aspect of this embodiment the location measurement procedure comprises a procedure of an LPP protocol with the relay UE.

In a second aspect of this embodiment the E-SMLC further performs a procedure of an LPPa protocol with a base station.

In a third aspect of this embodiment the E-SMLC retrieves an indication of a short range RAT used between the remote UE and the relay UE according to the procedure of the LPPa protocol.

In a fourth aspect of this embodiment the E-SMLC further performs a procedure of an LPP protocol with the remote UE.

In a fifth aspect of this embodiment the E-SMLC performs a first positioning method according to the location measurement procedure with the relay UE, and wherein the E-SMLC performs a second positioning method according to a location measurement procedure with the remote UE.

In a sixth aspect of this embodiment the first and second positioning methods are different.

In a seventh aspect of this embodiment the E-SMLC calculates the estimated position of the remote UE based on the location measurement of the relay UE and the remote UE which are again based on the location measurements of the first positioning method and the second positioning method.

In an eighth aspect of this embodiment the E-SMLC further performs a location measurement procedure with the remote UE, wherein a location of the remote UE relative to the relay UE is based on a measurement by the remote UE of a short range interface between the remote UE and the relay UE, and wherein the E-SMLC calculates the estimated position of the remote UE by calculating the estimated position of the remote UE based on the location measurements of the relay UE and the remote UE.

In a ninth aspect of this embodiment the E-SMLC performs the location measurement procedure with the relay UE comprises the E-SMLC measures a location of the remote UE relative to the relay UE based on a measurement by the relay UE of a short range interface between the remote UE and the relay UE, and wherein the E-SMLC calculates the estimated position of the remote UE by calculating the estimated position of the remote UE based at least in part on the location measurements of the relay UE.

In a tenth aspect of this embodiment the MME receives the LCS-AP location response including the estimated position and the estimated range when the estimated range is below a threshold or the MME receives the LCS-AP location response including a fail indication when the estimated range is above the threshold after the E-SMLC performs a location measurement procedure with the remote UE, wherein a location of the remote UE relative to the relay UE is based on a short range measurement and after the E-SMLC calculates an estimated range between the remote UE and the relay UE.

In an eleventh aspect of this embodiment the LCS-AP location request includes an indication of a short range RAT used between the remote UE and the relay UE.

While this present disclosure has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A method for locating a remote user equipment (UE) linked to a relay UE in a network, the method comprising:
   receiving, by an Evolved-Serving Mobile Location Center (E-SMLC), a Location Service Application Protocol (LCS-AP) location request from a Mobility Management Entity (MME) for the remote UE, wherein the E-SMLC is a network entity;
   sending, by the E-SMLC, a location measurement information request to the relay UE;
   receiving, by the E-SMLC, a location measurement information response comprising measurement information from the relay UE;
   calculating, by the E-SMLC, an estimated position of the remote UE based on the measurement information from the relay UE, the relay UE and the remote UE being different end-user devices, the remote UE indirectly linked to a network via the relay UE; and
   sending, by the E-SMLC, a LCS-AP location response to the MME, wherein the LCS-AP comprises the estimated position of the remote UE.

2. The method of claim 1, wherein sending the location measurement information request and receiving the location measurement information response comprises using a Long Term Evolution (LTE) positioning protocol (LPP protocol).

3. The method of claim 1, wherein sending the location measurement information request further comprises sending a location measurement information request to a base station, and wherein receiving the location measurement response further comprises receiving a location measurement information response from the base station.

4. The method of claim 1, wherein sending the location measurement information request further comprises sending a location measurement information request to a remote UE, and wherein receiving the location measurement information response further comprises receiving a location measurement information response from the remote UE.

5. The method of claim 1, wherein receiving the location measurement information response from the relay UE comprises receiving a location measurement according to a first positioning method and further comprising receiving a location measurement information response from the remote UE according to a second positioning method.

6. The method of claim 5, wherein the first and second positioning methods are different.

7. The method of claim 6, wherein calculating the estimated position of the remote UE comprises calculating the estimated position of the remote UE based on the location measurement received according to the first positioning method and the location measurement information response received according to the second positioning method.

8. The method of claim 1, further comprising receiving a location measurement information response from the remote UE, wherein a location of the remote UE relative to the relay UE is based on a location measurement of a short range interface between the remote UE and the relay UE, and wherein calculating the estimated position of the remote UE comprises calculating the estimated position of the remote UE based on location measurements received from the relay UE and the remote UE.

9. The method of claim 1, wherein the location measurement information comprises a first location measurement of a short range interface between the remote UE and the relay UE, and wherein calculating the estimated position of the remote UE comprises calculating the estimated position of the remote UE based at least in part on the first location measurement of the relay UE.

10. The method of claim 1, further comprising:
   receiving a location measurement information response from the remote UE, wherein a location of the remote UE relative to the relay UE is based on a short range measurement;
   calculating an estimated range,
   wherein sending, by the E-SMLC, the LCS-AP location response to the MME comprises:
   sending the LCS-AP location response to the MME including the estimated position and the estimated range when the estimated range is equal or below a threshold; or sending the LCS-AP location response to the MME including a fail indication when the estimated range is above the threshold.

11. The method of claim 1, wherein the LCS-AP location request includes an indication of a short range radio access technology (RAT) to be used between the remote UE and the relay UE.

12. A network entity comprising:
   a memory storage comprising instructions; and
   one or more processors in communication with the memory storage, wherein the one or more processors execute the instructions to:
   receive a Location Service Application Protocol (LCS-AP) location request from a Mobility Management Entity (MME) for a remote user equipment (UE);
   sending a location measurement information request to a relay UE;
   receiving a location measurement information response from the relay UE comprising measurement information from the relay UE;
   calculate an estimated position of the remote UE based on the measurement information from the relay UE, the relay UE and the remote UE being different end-user devices, the remote UE indirectly linked to a network via the relay UE; and
   send a LCS-AP location response to the MME, wherein the LCS-AP location response includes the estimated position of the remote UE.

13. The network entity of claim 12, wherein the instructions to receive the location measurement information response from the relay UE comprises instructions to receive a location measurement according to a first positioning method, and wherein the instructions further comprise instructions to receive a location measurement information response from the remote UE according to a second positioning method.

14. The network entity of claim 13, wherein the first and second positioning methods are different.

15. A method for locating a remote user equipment (UE) linked to a relay UE in a network, the method comprising:
   sending, by a Mobility Management Entity (MME), a Location Service Application Protocol (LCS-AP) location request to an Evolved-Serving Mobile Location Center (E-SMLC) for the remote UE, wherein the E-SMLC is a network entity; and receiving, by the MME, a LCS-AP location response from the E-SMLC,
wherein the received response includes an estimated position of the remote UE based on a measurement information from the relay UE, the relay UE and the remote UE being different end-user devices, the remote UE indirectly linked to the network via the relay UE.

16. The method of claim 15, wherein the estimated position of the remote UE is based on the measurement information from the relay UE and a location of the remote UE relative to the relay UE, and wherein the location of the remote UE relative to the relay UE is based on a measurement of the location of the remote UE relative to the relay UE measured via a short range interface between the remote UE and the relay UE.

17. The method of claim 15, wherein the estimated position of the remote UE is based on the measurement information from the relay UE and a measurement of a location of the remote UE relative to the relay UE via a short range interface between the relay UE and the remote UE, and wherein receiving, by the MME, the LCS-AP location response from the E-SMLC comprises:
receiving, by the MME, the LCS-AP location response including the estimated position and an estimated range when the estimated range is equal or below a threshold; or
receiving, by the MME, the LCS-AP location response including a fail indication when the estimated range is above the threshold.

18. The method of claim 15, wherein the LCS-AP location request includes an indication of a short range radio access technology (RAT) to be used between the remote UE and the relay UE.

19. The method of claim 15, wherein the estimated position of the remote UE is based on location measurements of a first positioning method and a second positioning method.

20. The method of claim 19, wherein the first and second positioning methods are different.

21. The method of claim 15, wherein the estimated position of the remote UE is estimated by using a Long Term Evolution (LTE) positioning protocol (LPP protocol).

22. A network entity comprising:
a memory storage comprising instructions; and
one or more processors in communication with the memory storage, wherein the one or more processors execute the instructions to:
send a Location Service Application Protocol (LCS-AP) location request to an Evolved-Serving Mobile Location Center (E-SMLC) for a remote user equipment (UE), wherein the E-SMLC is a second network entity; and
receive a LCS-AP location response from the E-SMLC, wherein the received response includes an estimated position of the remote UE based on a measurement information from a relay UE, the relay UE and the remote UE being different end-user devices, the remote UE indirectly linked to the network via the relay UE.

23. The network entity of claim 22, wherein the estimated position of the remote UE is based on the measurement information from the relay UE and a location of the remote UE relative to the relay UE, and wherein the location of the remote UE relative to the relay UE is based on a measurement of the location of the remote UE relative to the relay UE measured via a short range interface between the remote UE and the relay UE.

24. The network entity of claim 22, wherein the estimated position of the remote UE is based on the measurement information from the relay UE and a measurement of a location of the remote UE relative to the relay UE via a short range interface between the relay UE and the remote UE, and wherein the instructions to receive the LCS-AP location response from the E-SMLC comprises the instructions to:
receive the LCS-AP location response including the estimated position and an estimated range when the estimated range is equal or below a threshold; or
receive the LCS-AP location response including a fail indication when the estimated range is above the threshold.

25. The network entity of claim 22, wherein the LCS-AP location request includes an indication of a short range radio access technology (RAT) to be used between the remote UE and the relay UE.

26. The network entity of claim 22, wherein the estimated position of the remote UE is based on location measurements of a first positioning method and a second positioning method.

27. The network entity of claim 26, wherein the first and second positioning methods are different.

28. The network entity of claim 22, wherein the estimated position of the remote UE is estimated by using a Long Term Evolution (LTE) positioning protocol (LPP protocol).

* * * * *

UNITED STATES PATENT AND TRADEMARK OFFICE
CERTIFICATE OF CORRECTION

Page 1 of 1

PATENT NO. : 10,524,224 B2
APPLICATION NO. : 15/653119
DATED : December 31, 2019
INVENTOR(S) : Nathan Edward Tenny It is certified that error appears in the above-identified patent and that said Letters Patent is hereby corrected as shown below:

In the Claims

In Column 13, Line 21, Claim 17, delete "and wherein receiving, by the MME, the LCS-AP location" and insert --and wherein receiving the LCS-AP location--.

Signed and Sealed this
Fifth Day of May, 2020

Andrei Iancu
*Director of the United States Patent and Trademark Office*